(12) United States Patent
Vera Manero et al.

(10) Patent No.: US 10,395,160 B2
(45) Date of Patent: Aug. 27, 2019

(54) IDENTIFIER DEVICE

(71) Applicant: MYSPHERA, S.L., Paterna (Valencia) (ES)

(72) Inventors: Salvador Vera Manero, Paterna (ES); Julián Guirao Aguilar, Paterna (ES); Vicente Ruedas Abarca, Paterna (ES); Eduardo Montón Sánchez, Paterna (ES)

(73) Assignee: Mysphera, S.L., Paterna (Valencia) (ES)

( * ) Notice: Subject to any disclaimer, the term of this patent is extended or adjusted under 35 U.S.C. 154(b) by 0 days.

(21) Appl. No.: 15/566,569

(22) PCT Filed: Apr. 13, 2015

(86) PCT No.: PCT/ES2015/070290
§ 371 (c)(1),
(2) Date: Oct. 13, 2017

(87) PCT Pub. No.: WO2016/166383
PCT Pub. Date: Oct. 20, 2016

(65) Prior Publication Data
US 2018/0096239 A1   Apr. 5, 2018

(51) Int. Cl.
*A44C 5/00* (2006.01)
*A44C 5/18* (2006.01)
(Continued)

(52) U.S. Cl.
CPC .......... *G06K 19/07762* (2013.01); *A44C 5/00* (2013.01); *G06F 19/00* (2013.01);
(Continued)

(58) Field of Classification Search
None
See application file for complete search history.

(56) References Cited

U.S. PATENT DOCUMENTS

| 5,504,474 A * | 4/1996 | Libman ............ G06K 19/07762 340/573.4 |
| 6,853,304 B2 * | 2/2005 | Reisman ................ G08B 21/22 340/539.31 |

(Continued)

FOREIGN PATENT DOCUMENTS

| WO | 03/009224 A1 | 1/2003 |
| WO | 2010/089745 A2 | 8/2010 |

OTHER PUBLICATIONS

International Search Report dated Nov. 20, 2015 for Application No. PCT/ES2015/070290.

(Continued)

*Primary Examiner* — John F Mortell
(74) *Attorney, Agent, or Firm* — Ladas & Parry LLP

(57) ABSTRACT

An identification device that can be adjustably fit around an object or person whose identity is to be monitored includes an electrically conductive identification strap; electrically conductive locking means designed for adjustable circular locking of the identification strap around a predetermined part of the object or person whose location is to be monitored, thus forming a closed electrical circuit when the electrically conductive identification band and the locking means are both in the working or closed position; and a wireless communications transceiver module designed to establish communication with at least one transceiver module mounted in a different identification device fit onto a different object or person, wherein a first transceiver module executes a linking procedure by radio transmission of identification data streams to at least one other transceiver module in listening mode to receive the identification data stream transmitted from the first identification device.

9 Claims, 2 Drawing Sheets

(51) Int. Cl.
  *G06K 19/077* (2006.01)
  *G06F 19/00* (2018.01)
  *H04W 84/18* (2009.01)
  *G08B 21/02* (2006.01)
  *G08B 21/22* (2006.01)
  *H04B 7/26* (2006.01)
  *H04W 4/04* (2009.01)
  *G06K 19/07* (2006.01)

(52) U.S. Cl.
  CPC ..... *G06K 19/0723* (2013.01); *G08B 21/0202* (2013.01); *G08B 21/22* (2013.01); *H04B 7/26* (2013.01); *H04W 4/04* (2013.01); *H04W 84/18* (2013.01)

(56) References Cited

U.S. PATENT DOCUMENTS

| | | | | |
|---|---|---|---|---|
| 2003/0194084 | A1* | 10/2003 | Gilmour | H04B 1/385 379/433.1 |
| 2003/0210149 | A1* | 11/2003 | Reisman | G08B 21/22 340/573.4 |
| 2007/0120687 | A1* | 5/2007 | Lerch | G06K 19/04 340/572.9 |
| 2007/0241876 | A1* | 10/2007 | Johnston | G08B 17/00 340/506 |
| 2008/0290176 | A1 | 11/2008 | Fleet | |
| 2011/0226861 | A1* | 9/2011 | Warther | G06K 19/041 235/492 |
| 2012/0001751 | A1 | 1/2012 | Baker et al. | |
| 2013/0182382 | A1* | 7/2013 | Vardi | G08B 13/1463 361/679.01 |

OTHER PUBLICATIONS

Zigbee Alliance: "Zigbee Specification, Document 053474r06, Version 1.0"; Apartado 2.7.1.2 "Permitting devices to join a network" (pag. 211); Publicado en internet Dec. 14, 2004 URL: http://www3.nd.edu/••mhaenggi/ee67011/zigbee.pdf.

* cited by examiner

IDENTIFIER DEVICE

RELATED APPLICATION

This application is a national phase entry under 35 USC 371 of international Patent Application No.: PCT/ES201.5/070290 filed on 13 Apr. 2015, the disclosure of which is incorporated herein by reference in its entirety.

PURPOSE

This invention relates to an identification and location device for an object or a person within a building, and more specifically a device having a compact smart identification strap associated with an object or person to identify the said object or person and further to track the location of that object or person inside a building.

BACKGROUND

The use of identification straps placed around a part of an object or a person whose location is to be tracked having locking means that attach the ends of the strap together to form a locked, unchangeable circumference large enough to fit comfortably around the object or person but small enough so that the strap does not slip off from the part of the object or person to which it has been fastened are known to the prior art.

In certain applications it is useful to be able to place an identification strap on young children so that a person in charge of caring for a child is able to monitor that child.

The locked circumference of the identification strap should be tight enough so that it does not loosen and slip off the child's wrist or ankle and so that it cannot be cut off.

Should this happen, the identification strap no longer serves its purpose, in that it no longer identifies the child with the required degree of security, and indeed identification of the child may even be completely lost.

Restricting the possibility for an identification strap inadvertently to slip off or be cut off a child's wrist or ankle is therefore highly appropriate.

SUMMARY

This invention seeks to solve one or more of the disadvantages referred to above by means of an adjustable identification device as set forth in the claims.

The adjustable identification device provides an identification kit that includes at least an electrically conductive identification strap for secure, adjustable circular locking of the identification strap so that it fits around a predetermined part of an object or person whose location is to be monitored; locking means; and a wireless communications transceiver module for establishing communication with other objects or persons inside a building.

The transceiver of the identification device is designed to transmit and receive signals, including a unique identification signal, to and from a different identification device attached to a different object, such that both identification devices are linked and can be located within the same building. The transceiver executes the stored identification, linking, and location programs of the linked identification devices. The transceiver is further capable of being connected to a control unit for inputting data, including the identification and linkage values for the linked identification devices, into transceiver memory.

A set of receivers is distributed at different points within the building, each of the receivers being capable of receiving signals, including identification signals, issued by the transceivers of the set of identification devices, and of transmitting the signals thus received to the control unit so as to establish the location of each identification device.

The transceiver of the identification device is mechanically attached to the identification strap fastened onto the part of the object or person whose location is to be monitored, for example, on a mother's wrist or on a baby's wrist or ankle.

The identification strap has a series of orifices made at either end of the strap to be able to adjust the size of the identification strap around the part of the object or person whose location is to be monitored when one end of the strap is brought up against the other end in order to lock the strap around the object or person whose location is to be monitored. By way of example, there may be a single orifice at one end of the strap and at least two orifices at the other end of the strap. The two ends of the identification strap are locked together by locking means made of a strip of flexible material having at one of its ends an orifice and at the opposite end a mechanical locking projection protruding outwards from the locking strip itself. The protruding locking projection comprises a member joined to the strip at one end that has an expanded portion at the distal end by way of a head, such that the head on the locking projection, pivotally attached to the end opposite the orifice on the locking means, can be removably inserted successively through a first orifice and a second orifice, respectively, at each end of the identification strap and finally inserted through the orifice on the locking means.

The conductive identification strap is an elongated flexible laminated member made of a soft, non-toxic material such as a plastic polymeric material doped with an electrically conducting material, wherein the conductive doping material has been dispersed within a matrix of the polymeric material, such that the conductive material forms a conductive network that allows an electric current to flow.

The identification strap is made from two different polymeric base materials, an ethylene propylene diene, or EPDM (ethylene propylene diene monomer [M-class]), rubber that is a thermoplastic elastomer with good abrasion and wear resistance and a thermoplastic polyurethane (TPU) with good flexibility over a broad range of temperatures.

Both the EPDM rubber and the TPU are doped with steel filaments (between 5 and 30% by weight). These steel filament-doped plastics have good electrical conducting properties, very good resistance to atmospheric agents, acids, and bases, as well as to chemicals generally.

The identification strap is manufactured using an injection moulding process that ensures that the outside of the identification strap is an electrical insulator while the inside is an electrical conductor, such that when the strap is fastened by the locking means, a closed electrical circuit is formed inside the identification strap. In manufacturing the identification strap, this feature is achieved without having to make any alterations to conventional injection moulding methods.

Similarly, the locking means is also an elongated flexible laminated member made of a soft, non-toxic material made from two different polymeric base materials, an ethylene propylene diene, or EPDM (ethylene propylene diene monomer [M-class]), rubber that is a thermoplastic elastomer with good abrasion and wear resistance and a thermoplastic polyurethane (TPU) with good flexibility over a broad range of temperatures.

The locking projection further comprises a tubular member joining the head of the projection to the locking strip, such that when the identification device is closed, i.e., the locking means is also in the closed or working position, the tubular member of the projection is designed to be capable, in the said working position, of forming an electrical circuit having electrical continuity around a predetermined part of the object or person whose location is to be monitored.

The tubular member of the mechanical locking projection comprises an electrically conductive material, such that the tubular member becomes part of the closed electric circuit that is formed when the locking means is in the working position, i.e., the locking means is closed so that it mechanically locks the two ends of the identification strap together when the mechanical locking projection is inserted through the two orifices in the identification strap and the orifice on the locking means. The locking means has a resting position in which the locking means is in the open position, i.e., the projection is not inserted into the orifice on the locking means.

In summary, the mechanical locking of the identification strap and the locking means provides electrical continuity between the two ends of the conductive identification strap when the identification strap has been mounted, adjusted, and locked around a predetermined part of the object or person whose identity is to be monitored.

The unidirectional locking projection is configured and arranged so as to allow the projection to be inserted through the orifice on the locking means and the two orifices on the identification strap all at once. In other words, the locking projection prevents the two ends of the identification strap from accidentally disengaging and breaking the closed electrical conductor thus formed.

By operating in linked mode with at least one other identification device, the identification device makes possible more secure identification between the original object or person and at least one other object or person, the mother and at least one child to be monitored and interconnected. By way of example, two objects or persons associated with two identification devices are discretely linked together by wireless communications established between the corresponding transceivers of the identification devices.

The identification device enables a mother and at least one child to be independently and discretely identified, located, and tracked, making it possible to locate the two persons inside a building, such as a hospital.

Where an object or person whose location is to be monitored moves outside a pre-established area, the control unit is configured to detect departure from the said area by means of the receivers, wherein the control unit is also configured to transmit an alarm signal to a monitoring station in the building.

In addition, where the electrical circuit formed when the identification device that is locked around an object or person is broken, the control unit is further configured to transmit a further alarm signal to the monitoring station in the building.

The control unit is designed for bidirectional communication with the receivers distributed around the building, and the receivers are also designed for bidirectional communication with the transceiver modules mounted in the identification devices.

The identification device is wearable, adjustable, and tamper-resistant. The control unit is designed to implement a wide range of rules in order to provide assistance to the monitored persons by transmitting the corresponding alarm signal to signify an abnormal situation.

BRIEF DESCRIPTION OF THE DRAWINGS

A more detailed explanation of the invention is given in the following description based on the attached Figures.

DESCRIPTION

Figure 1:
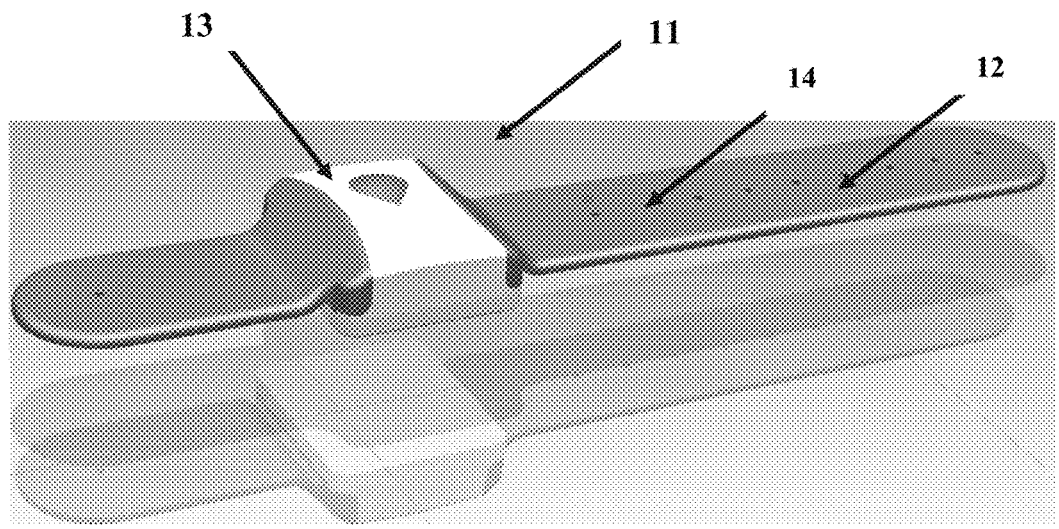
FIG. 1 shows a perspective view of an identification device.
Figure 2:
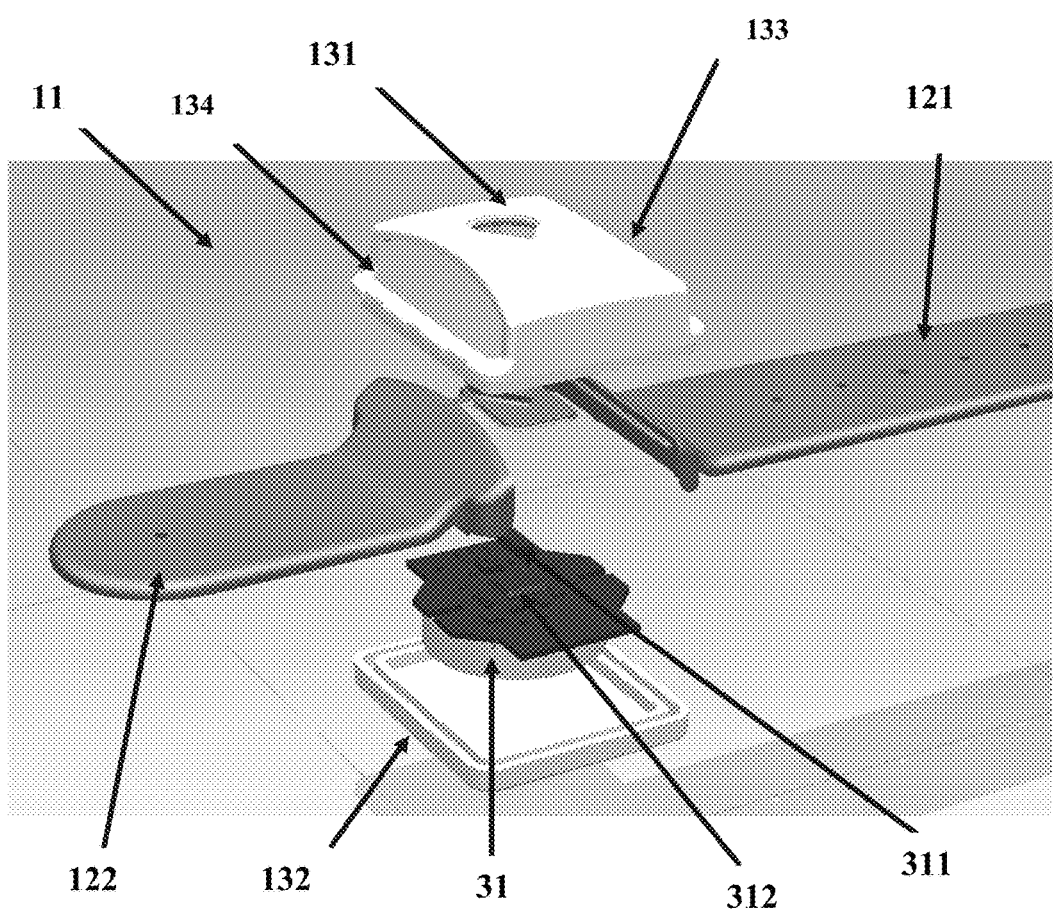
FIG. 2 shows an exploded perspective view of the identification device, an identification strap, a transceiver module, and a case.

FIGS. 1 and 2 show an adjustable identification device 11 that has an elongated flexible electrically conductive identification strap 12 for secure, adjustable circular locking around a predetermined part of an object or person whose identity is to be monitored, for example, a mother's wrist and a baby's ankle or wrist; a wireless communications transceiver module 31 for establishing wireless communication with at least one other identification device 11 within a pre-established area of a building, such as a hospital; and locking means 21 having two positions, a resting position associated with a position in which the identification device 11 is open and a working or closed position associated with a position in which the identification device 11 is closed or locked.

A set of receivers is arranged at different points within the building, each of the receivers being capable of receiving signals, including identification signals transmitted by the transceiver module 31 of the identification device 11, and of transmitting the signals thus received to a control unit so as to establish the location of each identification device 11 within the building.

The identification strap comprises a series of orifices 14 made at both ends of the identification strap 12 to be able to adjust the size of the identification strap 12 around the part of the object or person whose location is to be monitored when one end of the strap 12 is brought up against the other end of that same strap 12 in order to lock the strap around the object or person whose location is to be monitored, i.e., in the closed position of the strap 12. Distribution of the orifices 14 at either end of the strap 12 is as follows: for example, a single orifice at one of the ends and at least two orifices at the other end of the strap 12.

Figure 3:
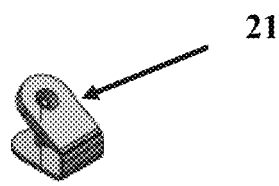
FIG. 3 shows a perspective view of locking means in an intermediate position between the open and closed positions.
Figure 4:
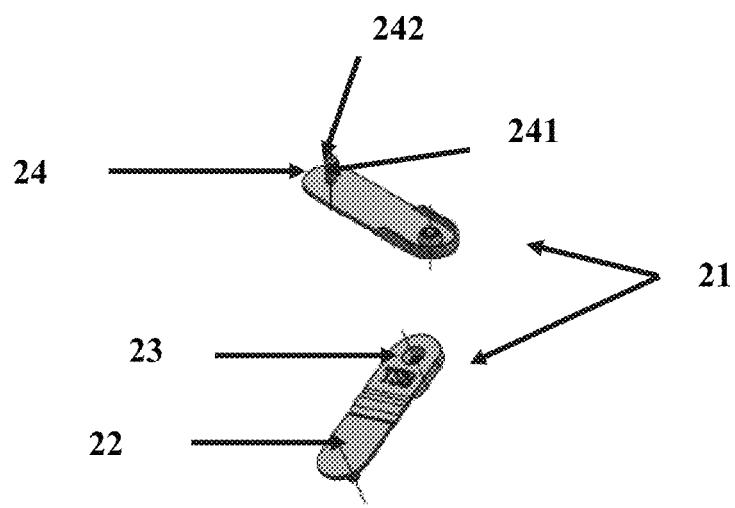
FIG. 4 shows a perspective view of the upper and lower surfaces of the locking means.

As shown in FIGS. 3 and 4, locking means 21 is made from an elongated strip of flexible material 22 and comprises an orifice 23 at one end of the strip 22 and a protruding mechanical locking projection 24 pivotally attached to the opposite end of the strip 22 containing the orifice 23 in the locking means 21. The projection 24 comprises a tubular member with an expanded portion by way of a head 242 in the shape of a truncated cone at one end of the strip 22 of the locking means; i.e., the projection 24 has a mushroom-like shape. When the identification device 11 is locked, i.e., the locking means 21 is in the working position, the head 242 is inserted into the orifice 23 on the strip 22 of the locking means 21.

The unidirectional locking projection 24 is configured and arranged so as to allow the projection to be simultaneously inserted through the two orifices 14 on the strap and the orifice 23 on the strip of the locking means 21.

The two ends of the identification strap 12 are fastened together by removably inserting the projection 21 successively through a first and a second orifice 14 respectively at either end of the identification strap and the orifice 23 on the locking means so as to lock the identification strap 12 closed and form a closed electrical circuit.

Accordingly, the identification device 11 and the locking means 21 are in a resting position, i.e., open, or in a working or closed position, whereby the identification device 11 is locked around a predetermined part of the object or person whose identity is to be monitored.

The identification strap can thus be fastened around a part of the object or person whose identity is to be monitored by mechanical locking of two orifices 14 on the identification strap 11, the orifice 21 on the locking means 21, and the projection 24 on the locking means.

The identification strap 11 comprises an elongated flexible laminated member made of a soft, non-toxic material such as a plastic polymeric material that comprises an electrically conducting material dispersed in the polymeric matrix to create an electrical conductor over the length of the identification strap to enable an electric current supplied by an electric current source, such as a battery, to flow.

The identification strap 12 is made from two different polymeric base materials, an ethylene propylene diene, or EPDM (ethylene propylene diene monomer [M-class]), rubber that is a thermoplastic elastomer with good abrasion and wear resistance and a thermoplastic polyurethane (TPU) with good flexibility over a broad range of temperatures.

Both the EPDM rubber and the TPU are doped with steel filaments (between 5 and 30% by weight). These steel filament-doped plastics have good electrical conducting properties, very good resistance to atmospheric agents, acids, and bases, as well as to chemicals generally.

The identification strap 12 is manufactured by an injection moulding process designed to supply an identification strap that is an electrical insulator on the outside, the EPDM rubber having good electrical insulating features, and a conductor on the inside by reason of a high concentration of steel filaments present in the middle portion of the identification strap 12, such that when the strap is closed by the locking means 21, a closed electrical circuit is formed inside the identification strap 12. In manufacturing the identification strap, this feature is achieved without having to make any modifications to conventional injection moulding methods.

The identification strap 12 is produced by a conventional injection moulding process. Depending on the injection rate and the temperature at which the plastic is injected, when a polymer loaded with a filler, especially a filler in the shape of filaments, is injected, a controlled distribution of the filament-filled polymer is achieved, such that the filaments are dispersed inside the identification strap 12 and the polymer is distributed on the outside of the identification strap 12, thereby insulating the inner portion where the dispersed filaments are located. Accordingly, an identification strap 12 that is an electrical insulator on the surface and an electrical conductor on the inside is obtained by optimising the rate at which the polymer and filament blend is injected together with the temperature of the plastic melt and the temperature of the mould.

Similarly, the locking means 21 is also an elongated flexible laminated member made of a soft, non-toxic material made from two different polymeric base materials, an ethylene propylene diene, or EPDM (ethylene propylene diene monomer [M-class]), rubber that is a thermoplastic elastomer with good abrasion and wear resistance and a thermoplastic polyurethane (TPU) with good flexibility over a broad range of temperatures.

The locking projection 24 further comprises a tubular member 241 joining the head 242 of the projection to the locking strip 22, such that when the identification device 11 is closed, i.e., the locking means 24 is also in the closed or working position, the tubular member 241 of the projection 24 is designed to be capable, when the identification device 11 is in the working position, of forming an electrical circuit having electrical continuity around a predetermined part of the object or person whose location is to be monitored.

The tubular member 241 of the mechanical locking projection 24 comprises an electrically conductive material, such that the tubular member 241 becomes part of the closed electric circuit that is formed when the locking means 21 is in the working position, i.e., the locking means 21 is closed so that it mechanically fastens the two ends of the identification strap 12 together when the mechanical locking projection is inserted through the two orifices in the identification strap and the orifice on the locking means. The locking means 21 has a resting position in which the locking means 21 is in the open position, i.e., the projection 24 is not inserted into the orifice 23 on the locking means.

FIG. 3 also shows the transceiver module designed to be mounted inside a hollow case 13 made from two parts, an upper part 131 and a lower part 132 made of a strong plastic material such as acrylonitrile butadiene styrene (ABS).

The case 13 has two openings 133, 134 in the opposing side walls for assembly of the two proximal ends 121, 122 of the identification strap 12. The two parts of the identification strap 12 are partially inserted into the opposing openings 133, 134 in the side of the cavity 13, such that the transceiver module 31 is held in place by simultaneously being engaged by the two ends 121, 122 of the identification strap 12.

The transceiver 31 includes engagement means that are driven into the two proximal ends 121, 122, such that the engagement means penetrate a sufficient depth into the identification strap 12 to reach the middle portion of that strap 12 where the conductive material is dispersed, in order to achieve electrical continuity for the electrical circuit formed by the conductive material in the identification strap 12 itself. The engagement means are arranged so that the transceiver 31 can be securely attached to the identification strap 12 and make electrical contact with the conductive material in the identification strap 12.

When the transceiver module 31 has been inserted into the case 13 and has been pressed into the identification strap 12, the case 13 is closed and sealed, for example, by ultrasonic welding.

Both the identification strap 12 and the case 13 may be made, for example, by overmoulding, i.e., the process whereby two components of different kinds or different colours are injected to form a single end product. This is a two-step process in which, in a first step, one of the components is injected, and, in a second step, the mould or the part is turned and the second component is injected. Where the product is manufactured in a single process, as many injection moulding units are needed as there are components for the part.

Where the identification strap 12 is manufactured using EPDF doped with steel filaments, the case 13 is manufactured from acrylonitrile butadiene styrene (ABS), which is a hard, rigid thermoplastic material that affords good impact resistance along with acceptable chemical resistance, low water absorption, and hence good dimensional stability and high abrasion resistance.

Where the strap 21 is made from TPU doped with steel filaments, the case is manufactured from polypropylene (PP) loaded with 5-30% talc or inorganic fillers. PP is an extremely versatile plastic that broadly exhibits good thermal properties as well as hardness, and it is subject to less contraction when loaded with inorganic particulate filler.

An alternative to overmoulding is to manufacture a pre-part on a conventional injection moulding machine with a single injection moulding assembly and then subsequently place the pre-part in a mould for overmoulding, as if injection moulding were being performed on an insert. This allows injection moulding of a two-component product on a simpler injection moulding machine.

In summary, overmoulding yields an identification device 11 that comprises the identification strap 12 and the case 13.

The transceiver module 31 includes a source of an electric current to inject electric current through the engagement module, specifically, through some electrical output terminals of the transceiver 31, such that the electric current injected is conducted by the electrical circuit formed by the conductive material to some electrical input terminals of the transceiver 31. The electric current source supplies an electric current, at a predetermined value, to the electrical circuit formed inside the identification device 11.

Both the input terminals and the output terminals are also connected to a control module included in the transceiver 31, which is designed to detect both the absence and the presence of electrical current flowing through the electrical circuit formed in the identification strap 12 when the identification strap 12 has been closed, adjusted, and locked around the object or person whose location is to be monitored and the transceiver 31 has been activated.

The transceiver 31 further includes a push button 311 and at least one light-emitting diode (LED) 312.

When a first and a second identification device 11 have been placed on two different objects or persons whose locations are to be monitored, the transceivers 31 of both the first and the second identification device 11 may be linked, thereby making it possible to verify, at any time, that both identification devices 11 are present within a defined area inside the building. The linking procedure comprises the steps of assigning the first identification device 11 to an object or person whose identity is to be monitored, for example, a mother in a given area inside the building, for example, a hospital's maternity ward.

From that time on, a control unit is capable of locating the mother inside the building, because the first transceiver 31 is capable of connecting to the control unit through a set of receivers arranged at different points within the building, each of the receivers being capable of receiving signals, including identification signals transmitted by transceiver module 31 of the identification device 11, and of transmitting the signals thus received to a control unit so as to establish the location of the first identification device 11 and, if appropriate, generate alarm signals.

The second identification device 11 is assigned to a baby, and the second identification device 11 is linked to the first identification device 11 associated with the mother. The linking method comprises the steps of bringing the second identification device 11 into proximity with the first identification device 11, pushing the push button 311 of the second identification device 11 and holding it down for a time, such that the second transceiver 31 switches to listening mode. This step in the linking or synchronisation procedure is indicated by the emission of light of a predetermined colour by the LED 312, indicating that the first and the second identification devices 11 are being linked. This status is indicated by blinking of the LED 312.

In listening mode, the second transceiver 31 waits to receive an identification data stream from the first transceiver 31. When the identification data stream has been received by the second transceiver 31, the linking method is complete. Completion of the procedure is indicated by a different predetermined colour and blinking by the LED 312.

After that, the first and second identification devices 11 are linked.

All the identification devices 11 are, in their turn, connected to the control unit, such that the control unit can issue alarm warnings in certain defined cases of alert; furthermore, the control unit can be used to locate individuals and monitor mothers and their babies.

The mother's master and the baby's slave identification devices can be synchronised by bringing the mother's and the baby's identification devices together and pressing and releasing the push button 311 on the mother's master or the baby's slave identification device 11. This status is indicated by a colour code produced by LED 312. For example, an orange LED indicates that synchronisation is in progress, and if the procedure achieves a positive outcome, the LED 312 emits a green light; if, by contrast, the procedure yields a negative outcome, the LED will emit a red light.

Synchronisation may be performed from any identification device 11 without distinction. Linking can also be verified by bringing two identification devices 11 together and pressing and releasing push button 311.

Thus, the transceiver module 31 of a first identification device 11 attached to an object or person whose identity and location are to be monitored is designed to execute a linking procedure by radio transmission of an identification data stream to the transceiver module of a second identification device 11 attached to a different object or person.

The transceiver 31 of identification device 11 is configured to transmit and receive signals, including a unique identification signal, to and from a different identification device 11 attached to a different object or person, such that both identification devices 11 are linked and located within the same building. The transceiver 31 executes the stored identification, linking, and location programs of the linked identification devices 11. The transceiver 31 is further capable of being connected to the control unit for inputting data, including the identification and linkage values of the linked identification devices 11, into the memory of the transceiver 31.

A set of receivers is arranged at different points within the building, each of the receivers being capable of receiving signals, including identification signals, issued by the transceivers 31 of the set of identification devices 11, and of transmitting the signals thus received to the control unit so as to establish the location of each identification device 11 and generate alarm signals if appropriate.

The identification device 11 enables linked objects or persons to identify, locate, and track each other, for example, a mother and child, making it possible to locate both persons within a predetermined area of the hospital and, if one of the persons is located outside that area or in an unauthorised area of the hospital, the control unit, which is linked to the linked identification devices by radio, is configured to generate an alarm signal to a pre-established hospital monitoring station.

If the identification strap 12 of an identification device 11 is opened, i.e., the electrical conductor along the length of the identification strap is opened, the transceiver 31 of the identification strap is capable of detecting the absence of an electric current flowing through that electrical conductor and of sending a warning signal to a monitoring station through the receiver network distributed throughout the building. In consequence, personnel in charge of the objects or persons whose identity is to be monitored may check the cause of the incident that has occurred and eliminate the cause that has given rise to the first alarm signal.

Where an object or person whose location is to be monitored moves outside a pre-established area, the control unit is configured to detect departure from the said area by means of the receivers, wherein the control unit is also configured to transmit an alarm signal to a monitoring station in the building.

Furthermore, if the electrical circuit formed when the identification device 11 locked around an object or person is opened, the control unit is configured to further transmit an alarm signal to the building's monitoring station.

The control unit is designed for bidirectional communication with the receivers distributed around the building, and the receivers, in their turn, engage in bidirectional communication with the transceiver modules 31 of the linked identification devices 11.

Identification device 11 enables more secure identification of a newborn throughout the entire postnatal period following birth, throughout the hospitalisation period, until discharge from the hospital, thereby preventing switching of newborns.

The identification device 11 further provides unique and definite mother-infant identification, coded by means of an alphanumeric code, both at the time of birth in the delivery room and during stays in other parts of the hospital.

The invention claimed is:

1. An identification device that can be adjustably attached to an object or person whose identity is to be monitored, the identification device (11) comprising
    (a) an electrically conductive identification strap (12) having an outside surface that is an electrical insulator and an interior beneath the outside surface comprising an electrically conductive doped rubber;
    (b) an electrically conductive locking member (21) made from an elongate strip of flexible material (22) comprising an orifice (23) at one end of the elongate strip and a protruding mechanical locking projection (24) at an opposite end of the elongate strip, the elongate strip being constructed and arranged to allow pivoting of the locking projection between an open position, wherein the locking projection (24) is not inserted through the orifice (23) at the one end of the elongate strip, and a working or closed position wherein the locking projection (24) is inserted through both the orifice (23) at the one end of the elongate strip and through the strap at any one of a plurality of positions to form an adjustable circular attachment of the identification strap (12) around a predetermined part of the object or person whose location is to be monitored and also to form a closed electrical circuit when the electrically conductive identification strap (12) and the locking member (21) are both in the working or closed position, the closed electrical circuit being formed by the locking projection contacting the electrical conductive doped rubber in the interior of the identification strap; and
    (c) a first wireless communications transceiver module (31) adapted to establish communication with at least a second transceiver module (31) mounted in a different identification device (11) attached to a different object or person.

2. The device according to claim 1, wherein the identification strap (12) is made by dispersing an electrically conductive doping material into the interior by an injection moulding process, whereby the conductive material forms an electrical conductor within the interior of the identification strap (12).

3. The device according to claim 2, wherein the identification strap (12) comprises EPDM (ethylene propylene diene monomer [M-class]), rubber.

4. The device according to claim 1, wherein the locking member (21) comprises EPDM (ethylene propylene diene monomer [M-class]) rubber.

5. The device according to claim 1, wherein the first transceiver module (31) includes a source of electric current to supply, at a predetermined value, an electric current to the closed electrical circuit.

6. The device according to claim 5, wherein the first transceiver module (31) is adapted to execute a linking procedure by radio transmission of identification data streams to at least the second transceiver module (31) that is in listening mode to receive an identification data stream transmitted from the first identification device (11).

7. An identification method for identifying objects or persons, comprising the steps of:
    (a) providing a plurality of identification devices according to claim 1, including a first identification device and a second identification device;
    (b) placing the first identification device on a first object or person by pivoting the locking projection of the first identification device from the open position to the working or closed position such that the locking projection of the first identification device is inserted through both the orifice at the one end of the elongate strip and through the strap at any one of the plurality of positions of the first identification device and such that the locking projection of the first identification device passes through the outside surface consisting of an electrical insulator and contacts the electrical conductive doped rubber in the interior of the identification strap of the first identification device to form a closed electrical circuit and also to form a circular attachment of the identification strap of the first identification device around a predetermined part of the first object or person;
    (c) placing the second identification device on a second object or person by pivoting the locking projection of the second identification device from the open position to the working or closed position such that the locking projection of the second identification device is inserted through both the orifice at the one end of the elongate strip and through the strap at any one of the plurality of positions of the second identification device and such that the locking projection of the second identification device passes through the outside surface consisting of an electrical insulator and contacts the electrical conductive doped rubber in the interior of the identification strap of the second identification device to form a closed electrical circuit and also to form a circular attachment of the identification strap of the second identification device around a predetermined part of the second object or person;
    (d) bringing the first identification device (11) into proximity with the second identification device (11);
    (e) pressing and holding down a push button (311) included in the a second identification device (11) such that a second transceiver module (311) is switched to listening mode;

(f) transmitting an identification data stream from a first transceiver module in the first identification device (11); and (g) linking said first and second identification devices (11) when the identification data stream transmitted has been received by the second transceiver module (31).

8. The device according to claim 1, wherein the protruding mechanical locking projection (24) includes a tubular member (24) made of an electrically conductive material adapted to afford electrical continuity to the closed electrical circuit when the locking member and the identification strap are in the working or closed position.

9. The device according to claim 1, wherein the strap comprises a plurality of orifices and the locking projection (24) is insertable through the orifice at one end of the elongate strip and through any one of the plurality of orifices in the strap for adjusting the circular attachment of the identification strap around the predetermined part of the object or person.

\* \* \* \* \*